3,170,280
CARBON MONOXIDE ELIMINATOR
John H. Rees, 1410 Iroquois, Detroit, Mich.
Filed July 8, 1963, Ser. No. 293,470
7 Claims. (Cl. 60—30)

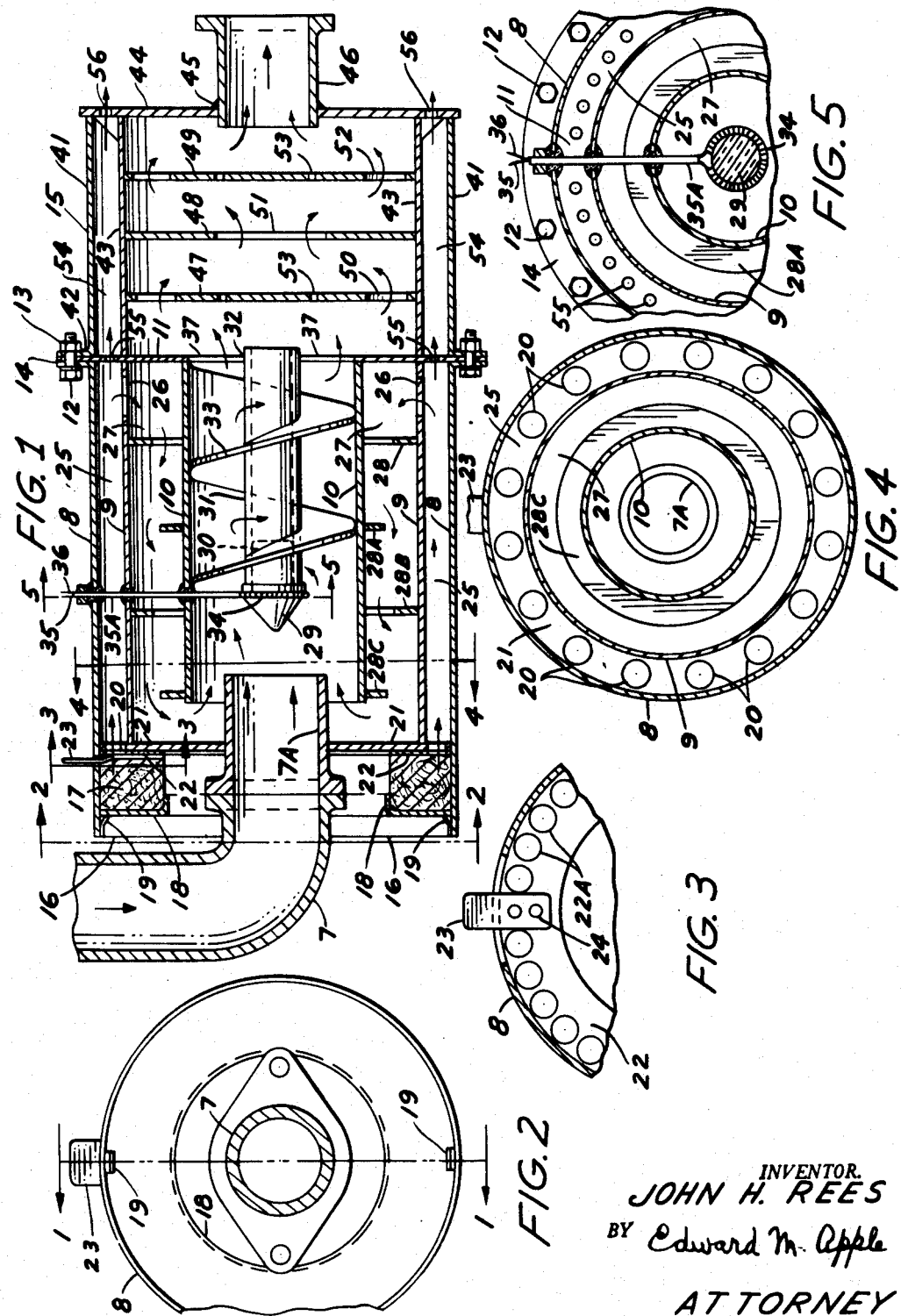

This invention relates to internal combustion engine powered automotive vehicles, and has particular reference to the exhaust system of such vehicles.

An object of the invention is to provide a device which will completely eliminate carbon monoxide from the products of combustion normally discharged to the atmosphere through the exhaust system of the vehicle.

Another object of the invention is to introduce fresh air directly into the exhaust system of the internal combustion engine, whereby to eliminate carbon monoxide by converting the carbon monoxide to carbon dioxide, which is then exhausted to atmosphere.

Another object of the invention is to introduce preheated fresh air into the exhaust system of the internal combustion engine, whereby to burn off carbon monoxide gas.

Another object of the invention is to introduce fresh air into the exhaust system, and to provide means for pre-heating the fresh air as it flows toward the hot exhaust gases of the system.

Another object of the invention is to introduce fresh air into the exhaust system of the vehicle with means for completely mixing the carbon monoxide charged exhaust gases with the incoming fresh air.

Another object of the invention is to provide an exhaust system with means for introducing fresh air thereto, and means to provide a prolonged period of time for burning the carbon monoxide gases and mixing them with the incoming fresh air.

Another object of the invention is to provide a device of the character indicated, which is provided with means for reducing the noise of back travel of the exhaust gases and means for assisting in the pre-heating of the oxygen laden air which is introduced into the exhaust system.

Another object of the invention is to provide a device of the character indicated, which is provided with means for causing a swirling action on the hot gases in the exhaust system, whereby to effect a more complete mixing of carbon monoxide charged exhaust gases with oxygen laden fresh air which is introduced to the system.

Another object of the invention is to provide a device of the character indicated, which is constructed with means to accomplish the scavenging of the carbon monoxide in the exhaust system by the introduction of oxygen.

Another object of the invention is to provide a device of the character indicated, which is constructed with means for controlling the volume of fresh air admitted to the exhaust system.

Another object of the invention is to provide a device of the character indicated, which is constructed with means to control the velocity of the gases entering and leaving the exhaust system of the vehicle.

Another object of the invention is to provide a device of the character indicated, which is constructed with means for pre-heating the interior of the device during the warming up period of the internal combustion engine.

Another object of the invention is to provide a carbon monoxide eliminator which may be employed with an exhaust system, such as disclosed in my copending application, Serial No. 215,693 filed August 8, 1962.

Another object of the invention is to provide an exhaust system in which the damage caused by the condensation of water vapor and the like, is obviated.

Another object of the invention is to provide an exhaust system for an internal combustion engine powered vehicle, which is constructed and arranged with means to eliminate the formation so-called "smog."

Another object of the invention is to provide an exhaust system for an internal combustion engine, which is constructed and arranged so that the noise factor normally associated with such systems is greatly reduced.

The foregoing and other objects and advantages of the invention will become more apparent as the description proceeds, reference being made from time to time to the accompanying drawing, forming part of the within disclosure, in which drawing:

FIG. 1 is a longitudinal section taken through a device embodying the invention.

FIG. 2 is a section taken substantially on the line 2—2 of FIG. 1.

FIG. 3 is a fragmentary section taken substantially on the line 3—3 of FIG. 1.

FIG. 4 is a section taken substantially on the line 4—4 of FIG. 1.

FIG. 5 is a fragmentary section taken substantially on the line 5—5 of FIG. 1.

Referring now more particularly to the drawing, it will be understood that in the embodiment herein disclosed, the reference character 7 indicates the exhaust manifold of an internal combustion engine to which is attached the device embodying the invention.

The device embodying the invention is preferably cylindrical in shape, and in general consists of the concentric metal tubular members 8, 9, and 10, which are held in spaced relation with each other, as hereinafter described. The members 8, 9, and 10 have a common rear wall 11, which is held in position by bolts 12 and nuts 13, which extend through an apertured flange 14 formed on the member 8, and on the muffler section 15, which is described more particularly hereinafter. The tubular member 8 is longer than the tubular members 9 and 10, and is open at the leading end 16 for the introduction of fresh air, which enters the end of the tube 8 and passes through an air cleaner pad 17, which is held in a circular retainer 18, which is held in position by spring fingers 19, secured to the inside wall of the tube 8. The fresh air passes through openings 20 formed in an end plate 21, which comprises the end closure for the tubular member 9. The openings 20 are controlled by an apertured flat ring 22 which lies flush against the side of the end plate 21, and is rotatable by means of a short lever 23, which is riveted thereto as at 24. The ring 22 may be rotated to bring the apertures 22A of the ring into alignment with the openings 20 in the end plate 21, so that the fresh air may enter the space 25, between the members 8 and 9. From the space 25, the air passes through the openings 26 formed in the member 9, into the space 27 between the members 9 and 10, where it changes direction and encounters the baffles 28, 28A, 28B, 28C. The baffles 28 and 28B also serve as spacers for the tubular members 9 and 10.

It will be noted that the tubular member 10 is shorter than the member 9, so that the fresh air after passing through the space 27 will strike the end plate 21 and be redirected into the interior of the tubular member 10, where it will mix with the hot combustion gases which are conveyed through the exhaust manifold 7 and the extension 7A thereof, which telescopes the end of the tubular member 10. The velocity of the hot gases leaving the end of the extension 7A causes a siphoning action on the incoming fresh air to also increase its velocity.

Positioned in the axial flow of the hot gases and spaced from the end of the extension 7A is a conical refractory member 29, which has a reduced section 30 which telescopes the end of a short tubular member 31, which is welded, or otherwise secured in an opening 32 formed in the rear wall 11. The tubular member 31 carries on its outer surface a spiral wall or guide 33, which gives a swirling action to the exhaust gases and the fresh air entering the member 10, as previously described. This provides a longer passageway for the air and gases, and gives a longer period of time for the oxygen in the air to mix with and burn the carbon monoxide from the combustion gases.

The refractory member 29 gets very hot from the gases of combustion and pre-heats the fresh air entering the interior of the member 10. I provide the refractory member 29 with a heating coil 34, which is electrically connected through the leads 35 and 36 with the electrical system of the vehicle. The leads are insulated in a sheathing 35A which extends through the walls of the members 8, 9, and 10. The coil 34 is arranged to heat up when the ignition key of the engine is turned on. It may be provided with a bi-metal switch to cut off the electrical power when the temperature of the exhaust gases reaches a predetermined point. The coil 34 is intended to provide a rapid heat up in the system when the engine is cold. The burning of the carbon monoxide and the transition to carbon dioxide is fully completed in the structure I have just described. The carbon dioxide and reduced gases are discharged from the interior of the member 10, through an opening 37 in the rear wall 11, and may be discharged directly into the frame members comprising part of the exhaust system as disclosed in my co-pending application, or they may be discharged to atmosphere through a tail pipe, as in conventional practice.

In some applications I may prefer to discharge the residue of the gases into a muffler structure 15, as shown in FIG. 1. In this embodiment, the muffler is indicated, in general, with the reference character 15, and consists of a tubular member 41 having a flange 42 arranged to engage the flange 14 of the member 8, and be held in position by the bolts 12 and nuts 13. A second tubular member 43 is positioned in spaced relation on the inside of the member 41. The members 41 and 43 are provided with a common end wall 44, which has a central opening 45 in which is positioned a flanged collar 46, to which a tail pipe or other exhaust system element may be attached.

The tubular member 43 is provided with a plurality of baffles 47, 48, and 49, which are provided with openings 50, 51, 52, and apertures 53 of different diameters to permit the passage there through of the combustion residue. A space 54 defined between the members 41 and 43 is arranged to receive fresh air from the space 25, through apertures 55 in the wall 11, and discharge it through apertures 56 in the end wall 44. This has a cooling effect on the muffler 15, and also tends to deaden the noises.

It is believed that the operation of the device is obvious from the foregoing description.

I claim:

1. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in communication with said first named air passageway, a compartively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a spiral wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, and an extension of said exhaust mainfold telescoping, in spaced relation, the leading end of said third tubular member.

2. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in communication with said first named air passageway, a comparatively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a spiral wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, and an extension of said exhaust manifold telescoping, in spaced relation, the leading end of said third tubular member and, a rotatable apertured plate in contact with the front face of the leading end plate of said device to control the area of certain of the openings communicating with said first air passageway.

3. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in communication with said first named air passageway, a comparatively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a spiral wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, an extension of said exhaust manifold telescoping, in spaced relation, the leading end of said third tubular member and an air cleaner superimposed on certain of the openings leading to said first air passageway.

4. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in communication with said first named air passageway, a comparatively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a spiral wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, an extension of said exhaust manifold telescoping, in spaced relation, the leading end of said third tubular member and an electric coil in contact with said refractory element for pre-heating said refractory element, said coil being connected to the electrical circuit of said engine.

5. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in communication with said first named air passageway, a comparatively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a spiral wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, an extension of said exhaust manifold telescoping, in spaced relation, the leading end of said third tubular member and a muffler connected to the trailing end plate of said device, said muffler having an air passageway in communication with said first named air passageway, and means to communicate said muffler air passageway with the atmosphere.

6. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in connection with said first named air passageway, a comparatively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a sprial wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, an extension of said exhaust manifold telescoping, in spaced relation, the leading end of said third tubular member and a muffler connected to the trailing end plate of said device, said muffler comprising a pair of concentric tubular members arranged in spaced relation to define an air passageway, openings connecting said last named air passageway to said first named air passageway in said device, openings communicating said last named air passageway with the atmosphere, the interior of the smaller of the last named pair of concentric tubular members being in communication with the interior of said third tubular member of said device and in communication with an exhaust outlet.

7. A carbon monoxide eliminator, comprising a tubular member attached to the exhaust manifold of an internal combustion engine, a second tubular member inside said first tubular member, and spaced there from along the sides to define an air passageway, common end plates for closing the ends of said tubular members, openings in said end plates in communication with said first named air passageway, a comparatively shorter third tubular member open at both ends and concentric with said first and second tubular members, and having its side walls spaced from said second tubular member to define a second air passageway, a refractory element positioned longitudinally in said third tubular member, a fourth tubular member secured to said refractory element, a spiral wall on the outside of said fourth tubular member, baffles in said second air passageway, openings in the walls of said second tubular member to provide communication between said first and second air passageway, means of communication between the second air passageway and the interior of said third tubular member, at the leading end of said third tubular member, an extension of said exhaust manifold telescoping, in spaced relation, the leading end of said third tubular member and a muffler connected to the trailing end plate of said device, said muffler comprising a pair of concentric tubular members arranged in spaced relation to define an air passageway, openings connecting said last named air passageway to said first named air passageway in said device, openings communicating said last named air passageway with the atmosphere, the interior of the smaller of the last named pair of concentric tubular members being in communication with the interior of said third tubular member of said device and in communication with an exhaust outlet, and apertured baffles in the said smaller of said last named pair of concentric tubular members.

References Cited by the Examiner
UNITED STATES PATENTS

| | | | |
|---|---|---|---|
| 1,495,690 | 5/24 | Hayes. | |
| 1,848,990 | 3/32 | Boyd et al. | 60—30 X |
| 1,875,025 | 8/32 | Kryzanowsky | 60—30 X |
| 1,966,620 | 7/34 | Fluor | 60—31 |
| 2,038,567 | 4/36 | Ittner | 60—30 X |
| 2,717,049 | 9/55 | Langford. | |
| 2,829,730 | 4/58 | Barkelew. | |

JULIUS E. WEST, *Primary Examiner.*